United States Patent [19]
Albrecht et al.

[11] Patent Number: 5,633,545
[45] Date of Patent: May 27, 1997

[54] DISK DRIVE IN-HUB RADIAL-GAP SPINDLE MOTOR WITH COILS GENERATING AXIAL FIELDS

[75] Inventors: David W. Albrecht; Michael A. Moser, both of San Jose, Calif.

[73] Assignee: International Business Machines Corporation, Armonk, N.Y.

[21] Appl. No.: 569,404

[22] Filed: Dec. 6, 1995

[51] Int. Cl.$^6$ ............................. H02K 1/00; H02K 1/12
[52] U.S. Cl. .................. 310/67 R; 310/68 R; 310/156; 310/266; 310/268
[58] Field of Search ................. 310/68 R, 67 R, 310/268, 156, 266

[56] References Cited

U.S. PATENT DOCUMENTS

| | | | |
|---|---|---|---|
| 2,986,684 | 5/1961 | Cluwen | 318/138 |
| 3,124,733 | 3/1964 | Andrews | 318/138 |
| 4,745,345 | 5/1988 | Petersen | 310/254 |
| 4,837,474 | 6/1989 | Petersen et al. | 310/254 |
| 4,841,393 | 6/1989 | MacLeod et al. | 360/98.07 |
| 4,949,000 | 8/1990 | Petersen | 310/179 |
| 5,195,002 | 3/1993 | Sakurai | 360/99.08 |
| 5,257,151 | 10/1993 | Cooper et al. | 360/98.07 |
| 5,296,981 | 3/1994 | Ogawa | 360/99.08 |
| 5,298,825 | 3/1994 | Oudet et al. | 310/156 |
| 5,352,947 | 10/1994 | MacLeod | 310/67 R |
| 5,382,853 | 1/1995 | von der Heide et al. | 310/67 R |
| 5,481,143 | 1/1996 | Burdick | 310/68 R |

FOREIGN PATENT DOCUMENTS

| | | | |
|---|---|---|---|
| 7-230663 | 8/1995 | Japan | G11B 19/20 |

*Primary Examiner*—Steven L. Stephan
*Assistant Examiner*—Tran N. Nguyen
*Attorney, Agent, or Firm*—Thomas R. Berthold

[57] ABSTRACT

An in-hub brushless permanent magnet DC motor has a radial working gap but uses coils wound in the axial direction of the motor. The coils generate fields that interact with the permanent magnet fields across the radial gap. The stator includes a plurality of angularly spaced stator teeth that have faces radially spaced across the gap from the permanent magnet. The stator teeth are connected to the base and extend axially into a cavity within the hub. The permanent magnet is a magnetically-segmented ring magnet located on an outer rim of the hub radially outwardly from the stator teeth. The magnetic flux from the permanent magnet is directed radially across the gap and into the stator teeth. Each stator tooth has an axially oriented post around which is wound a coil that generates an axial field. The axially-oriented part of each coil forms part of the magnetic circuit. The magnetic flux directed radially into each stator tooth is turned axially into the post and through the coil. The axially directed magnetic flux through the coil and post on each stator tooth is redirected from the axial direction to the circumferential direction by a ring magnetic flux guide. The ring flux guide interconnects the stator teeth and forms part of the magnetic circuit. Because the coils are wrapped around axial posts instead of the stator teeth a larger coil volume is obtained which results in higher motor efficiency and reduced heating of the bearing system. The angular spacing between adjacent teeth can be made very small or even eliminated since there is no need to locate a winding device between them as is required in conventional radial-gap motors. This results in a reduction in the motor cogging torque, which in turn allows a higher tooth/pole symmetry leading to better force balance and lower acoustic noise.

7 Claims, 5 Drawing Sheets

DISK DRIVE IN-HUB RADIAL-GAP SPINDLE MOTOR WITH COILS GENERATING AXIAL FIELDS

TECHNICAL FIELD

This invention relates to brushless permanent magnet direct current (DC) motors, such as those used as spindle motors in data recording disk drives.

BACKGROUND OF THE INVENTION

Permanent magnet direct current (DC) motors are in wide use in applications that require moderate torque within a small volume. The torque is generated by the interaction of two magnetic fields: a fixed magnitude one generated by a set of permanent magnets, and a variable amplitude one generated by a set of electromagnet coil windings. A high magnetic permeability material, such as electrical iron, is used to direct the magnetic flux to produce the largest possible interaction between the two fields. In brushless permanent magnet DC motors, the coil windings form part of the stator and remain stationary, and the permanent magnets form part of the rotor and rotate. The permanent magnets are arranged with alternating polarity, and as the rotor spins, the current in the coil windings is switched to produce the desired torque.

Brushless permanent magnet DC motors are used in spindle motors in small magnetic recording disk drives. The spindle motor rotates a hub that supports the disks. These are low-voltage motors; typically 12 V in 3.5 in. form factor disk drives and 5 V in 2.5 in. form factor disk drives. The permanent magnet is typically a ring magnet that generates a magnetic field in a radial direction across a radial gap. The coils are wound around radially oriented stator teeth and produce radially directed magnetic fields across the radial gap. An example of a disk drive with a radial-gap spindle motor is described in U.S. Pat. No. 5,352,947. The advantage of a radial-gap spindle motor is that it produces only small radial forces and no axial forces on the motor bearing assembly.

The torque generated in such motors is dependent on the number of amp-turns that each coil can carry. High torque is important to start the disk drive, especially in those disk drives that start and stop with the recording heads in contact with the disk surfaces since there is a static friction force that must be overcome at start-up. Therefore for high torque it is important that the coils have a large number of turns but that the overall electrical resistance of the coils be kept low. This is especially important for the low voltage disk drive motors. The primary disadvantages of such motors are the limited volume allowed between adjacent teeth and the requirement that the coil windings extend axially at least as high as the axial height of the stator teeth. In such a motor the coil wire length needs to be very long, which causes the motor to have high electrical resistance and therefore high losses and high self-heating. Also, because the coils are wound around the stator teeth, there must be some angular spacing of the stator teeth near the working gap to allow for insertion of a coil winding guide to fit between adjacent stator teeth. This increased spacing of adjacent stator teeth increases the cogging torque of the motor.

Co-pending application Ser. No. 08/400,645 filed Mar. 8, 1995 is directed to a radial-gap spindle motor that uses flat coils to generate axial fields and a ring flux guide to direct the flux circumferentially. In that invention, the flat coils, the stator teeth and the radial gap are generally in the same plane, and the stator teeth are located outside the motor hub.

What is needed is a disk drive radial-gap spindle motor with a large volume allowed for low resistance coils wound in a maximum number of turns, but with a small or minimal spacing between adjacent stator teeth to minimize the cogging torque of the motor.

SUMMARY OF THE INVENTION

The invention is an in-hub brushless permanent magnet DC motor that has a radial working gap but uses cylindrical coils wound in the axial direction of the motor. Although the coils generate axial fields, those fields are redirected to interact with the permanent magnet fields across the radial gap. The stator includes a plurality of angularly spaced stator teeth that have faces radially spaced across the gap from the permanent magnet. The stator teeth are connected to the base and extend axially into a cavity within the hub. The permanent magnet is a magnetically-segmented ring magnet located on an outer rim of the hub radially outwardly from the stator teeth. The magnetic flux from the permanent magnet is directed radially across the gap and into the stator teeth. Each stator tooth has an axially oriented post around which is wound a coil that generates an axial field. The axially-oriented part of each coil forms part of the magnetic circuit. The magnetic flux directed radially into each stator tooth is turned axially into the post and through the coil. The axially directed magnetic flux through the coil and post on each stator tooth is redirected from the axial direction to the circumferential direction by a ring magnetic flux guide. The ring flux guide interconnects the stator teeth and forms part of the magnetic circuit. Because the coils are wrapped around axial posts instead of the stator teeth a larger coil volume is obtained which results in higher motor efficiency (more turns per wire length) and reduced heating (lower wire electrical resistance) of the bearing system. The angular spacing between adjacent teeth can be made very small or even eliminated since there is no need to locate a coil winding device between them as is required in conventional radial-gap motors. This results in a reduction in the motor cogging torque, which in turn allows a higher tooth/pole symmetry leading to better force balance and lower acoustic noise.

For a fuller understanding of the nature and advantages of the present invention, reference should be made to the following detailed description taken together with the accompanying drawings.

DESCRIPTION OF THE PREFERRED EMBODIMENTS

Figure 1A:
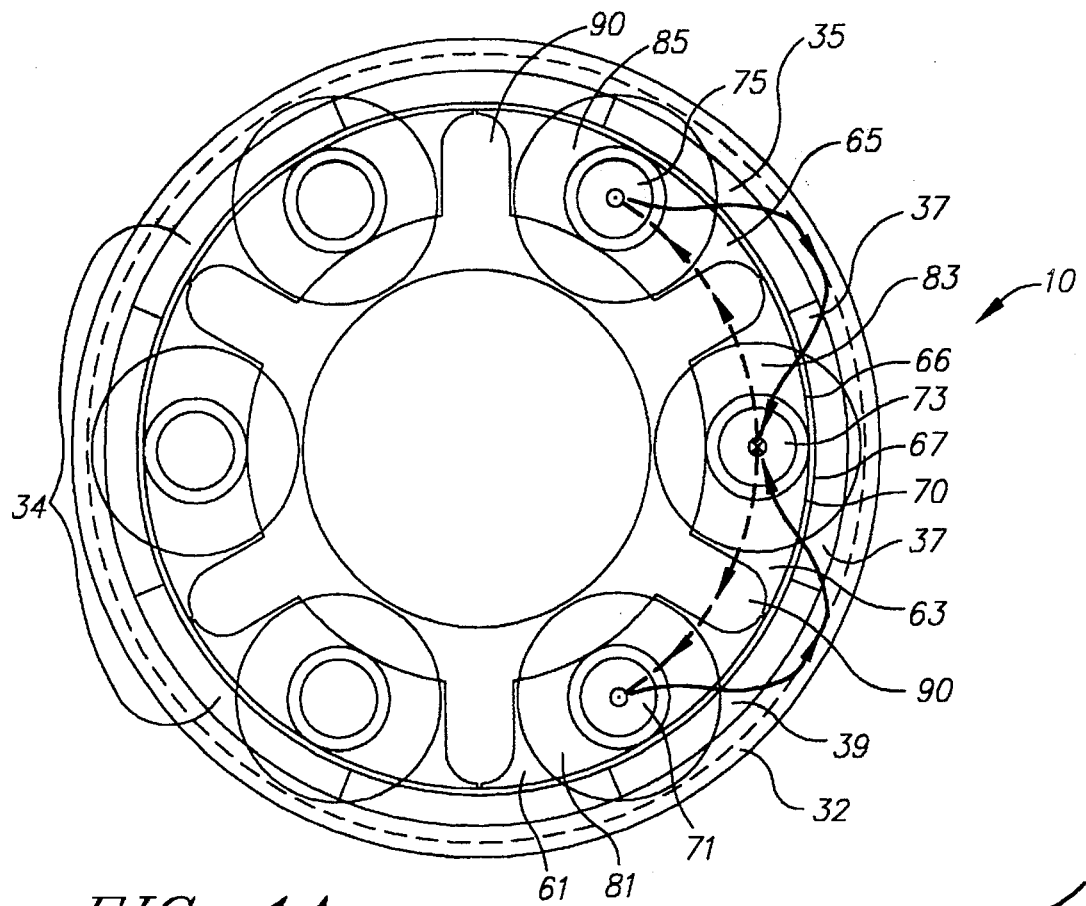
FIG. 1A is a top view of the preferred embodiment of the motor showing the motor in a fixed shaft spindle assembly.
Figure 1B:
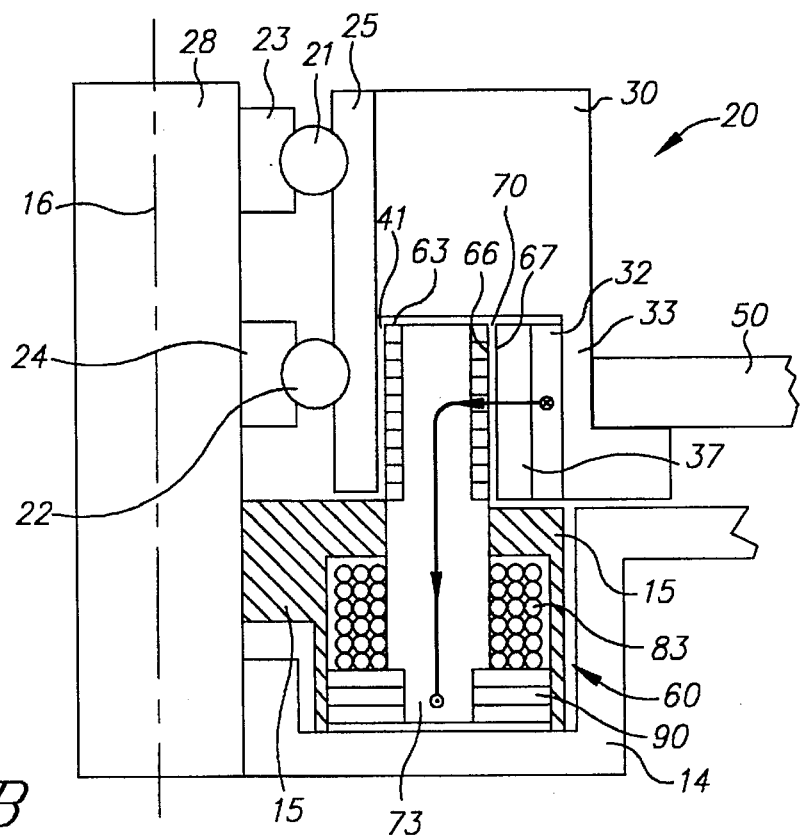
FIG. 1B is a sectional view of a portion of FIG. 1A and with the addition of a motor hub with attached disk and motor base.
Figure 1C:
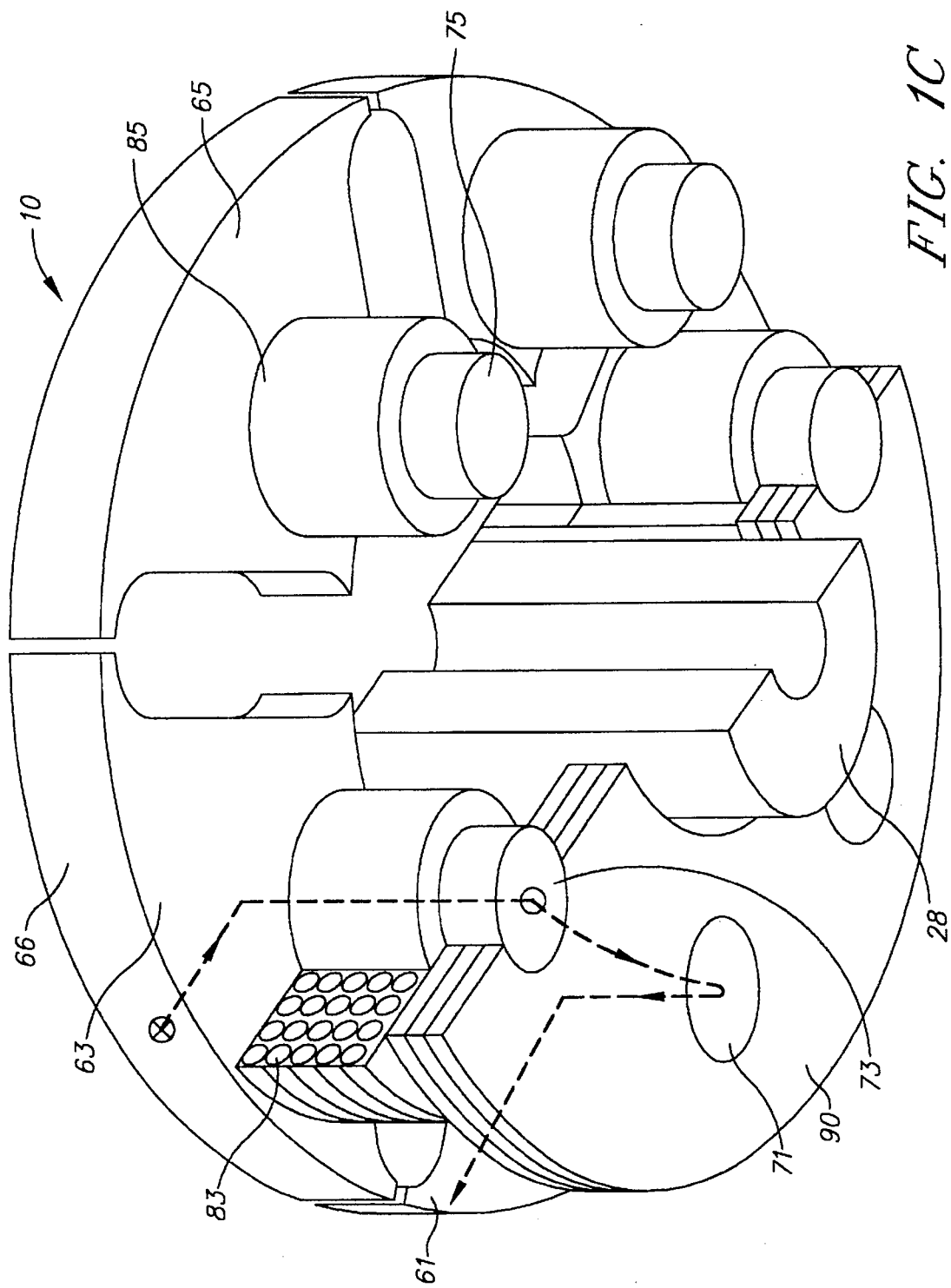
FIG. 1C is an isometric view of the motor of FIGS. 1A and 1B with a portion of the ring and some coils cut away to illustrate the relationship of the ring, axial posts, coils and stator teeth.

The brushless permanent magnet DC motor 10 according to the present invention is shown in FIGS. 1A–1C. The motor 10 includes a rotor 20 (FIG. 1B) that is attached to base 14 by a beating assembly and rotates about a central rotational axis 16, and a stator assembly 60 (FIG. 1B) also mounted to base 14.

The rotor 20 includes a hub 30, a beating assembly comprising a pair of upper and lower bearings 21, 22, each of which has inner races 23, 24, and a single-piece integral outer race 25 (FIG. 1B). Many types of bearing assemblies are possible in the present invention, including the conventional bearing system of a discrete pair of deep groove ball bearings with the outer races fixed in the bore of a cylindrical member, which in one embodiment can be hub 30. The inner races 23, 24 are secured to a fixed central shaft 28 that is secured to and axially extends from base 14. Shaft 28 has a central axis collinear with the central rotational axis 16 of rotor 20. A hub 30 forms part of rotor 20 and is attached to the outer race 25. Hub 30 has an outer circumferential rim 33 and an interior cavity 41. As shown in FIG. 1B, a magnetic recording disk 50 is mounted on hub 30. An annular backing rim 32 is attached to the inner wall of outer hub rim 33 if the hub 30 is not formed of magnetically permeable material. Backing rim 32 is preferably formed of a high-permeability, soft magnetic material, such as electrical iron or low-carbon steel, and is properly heat treated to obtain a high saturation magnetic flux density, typically above 14,000 Gauss. An annular ring permanent magnet 34 (FIG. 1A) is also part of rotor 20 and is attached to and located radially inwardly of backing rim 32. There are disk drive spindle hubs, especially those used with glass disk substrates, that are formed of magnetically permeable material and therefore do not require a separate backing rim.

Ring magnet 34 is a conventional type of magnet used in radial-gap brushless DC motors and has a plurality of angularly-spaced magnet segments with alternating magnetic polarities. The segments can be either discrete magnets or magnetically segmented but physically continuous portions of a single-piece ring. Adjacent magnet segments 35, 37, 39 are shown in FIG. 1A and magnet segment 37 is shown in FIG. 1B. The backing rim 32 located between hub 30 and ring magnet 34 provides a magnetic flux return path for the segments of ring magnet 34. The magnet 34 is preferably made of a ring of high-moment magnetic material such as neodymium-iron-boron or samarium-cobalt. However, the high efficiency of the motor also allows for lower grade extruded or molded types of magnets to be used instead of the more expensive sintered types. The remanent magnetic field induced in the ring magnet 34 during its fabrication results in multiple magnetic poles. The result is a ring magnet with a magnetic field that alternately points radially outwardly and inwardly around the ring. In the embodiment shown in the FIG. 1A, the ring magnet 34 has eight individual poles associated with the eight angularly-spaced magnet segments. However, it is well known in the design of brushless permanent magnet DC motors that different numbers of magnet segments and stator teeth can be selected. For example, the motor shown with six stator teeth can have ton magnet segments instead of eight.

The stator assembly 60 (FIG. 1B) includes a plurality of circumferentially-spaced stator elements or teeth attached to support sleeve 15 and to axially extending posts, such as post 73 for stator tooth 63. There are six equally angularly-spaced stator elements in the embodiment shown in FIG. 1A, including adjacent typical stator teeth 61, 63, 65. Each stator tooth, such as typical stator tooth 63, also shown in FIG. 1B, has a face 66 that faces the radially inner surface 67 of magnet segment 37 of ring magnet 34 to define a radial working gap 70. As shown by typical stator teeth 61, 63, 65 in FIG. 1A, adjacent stator teeth have their respective faces closely aligned circumferentially with each other. Stator tooth 63 is typical of the stator teeth shown in FIG. 1A. Stator tooth 63 is made up of several laminations (FIG. 1B) that are electrically insulated from each other with an insulating material such as an oxide layer or an insulation compound. The laminations are bonded together with an adhesive. The laminations serve to reduce eddy current losses in the motor. The individual stator teeth are attached to support sleeve 15 and to the posts with an adhesive or other fastening technique. Support sleeve 15 is attached to shaft 28 and motor base 14.

As shown in FIG. 1B, the axial thickness of stator tooth 63 in the region of the gap 70 is substantially the same as the axial thickness of the ring magnet 34 (as shown by magnet segment 37). While the thicknesses need not be the same, the central horizontal planes of the stator teeth and magnet segments should be axially aligned (i.e., be coplanar) so that there are minimal axial magnetic forces acting on the rotor 20.

An axially extending post and an electrically conductive coil wrapped about the post are located on each stator tooth. As shown in FIG. 1A, adjacent stator teeth 61, 63, 65 have axial posts 71, 73, 75 and corresponding coils 81, 83, 85. Post 73 with coil 83 is shown in sectional view in FIG. 1B. The coils create electromagnetic fields that interact with the permanent magnet field to produce torque in the motor. The coils are formed by winding insulated conductors of low resistivity material such as copper, aluminum or silver. When electrical current is applied to each of the coils, such as coil 83, a magnetic field is induced that is in the axial direction and generally aligned with the central axis of the cylindrical post, such as post 73. The cross-sectional area of post 73 is selected so that it is large enough that the sum of the fields created by the permanent magnet and the field induced by the coil 83 are insufficient to produce saturation in the post. At the same time, the post 73 cross-sectional area should be as small as possible to minimize its perimeter, which in turn reduces the length of the windings in the coil 83 and improves the motor efficiency. Since a circle has the smallest perimeter to area ratio, the coils of this motor will have the lowest possible electrical resistance for a given post cross-section.

In the preferred embodiment the post 73 in FIG. 1B extends completely through the lamination stack forming tooth 63. In this arrangement the post 73 provides a good alignment feature and good magnetic conductivity, but is also a potential conduction path for eddy currents, which produce motor losses. These losses can also be reduced if the post 73 is coated with an insulating treatment. In an alternative embodiment (not shown) the post 73 contacts the base of the laminations forming tooth 63, without extending into it. In this arrangement the post will be electrically insulated from the stator lamination stack by the coating on the tooth laminations. This reduces eddy current losses, but at a cost of a slightly degraded magnetic performance. If iron oxide (ferrite) is used as the materials for the posts then there is no need for an insulating coating because this material is both magnetically permeable and electrically insulating. In another alternative embodiment (not shown) the post 73 can extend only partially through the stack of laminations making up stator tooth 63, if there are two types of laminations. As shown in FIG. 1B, the stator teeth and portions of the posts extend axially into the hub cavity 41.

A major advantage of the present motor over conventional brushless DC motors with radial fields generated by the coils across the radial working gap is the close circumferential spacing of the stator teeth near the working gap 70. Since in the motor according to the present invention there are no conventional coils for generating radial fields across the radial gap, there is no requirement of circumferential spacing between adjacent stator teeth to allow for insertion of a coil winding guide. Thus, the edges of adjacent stator teeth at the working gap 70 can be arbitrarily close together to the point of being joined, leading to a reduction in the cogging torque of the motor. This close circumferential spacing between stator teeth 61 and 63 near the gap 70 is shown in FIG. 1A. However, as is known in the art, the stator teeth should be shaped away from these edges to reduce the parasitic flux losses and inductance increase in the motor caused by this additional flux path. In the case where the adjacent stator teeth are touching across a small cross section, it is permissible to fabricate all six teeth from a continuous lamination. In this case the thin web between teeth should be designed so that it is magnetically saturated during the majority of the operating cycle of the motor, thus acting like a high permeability path and not increasing the inductance in the motor.

A ring magnetic flux guide 90 interconnects each of the stator teeth. The flux guide 90 and the posts, such as typical post 73, are also formed of soft magnetically permeable material such as electrical iron or low-carbon steel. The ring 90 provides a path for magnetic flux, including the magnetic flux induced by each of the coils, between the adjacent posts. The ring 90 redirects the axially-directed flux from the coils to a circumferential direction around the stator and between adjacent stator teeth. Like the teeth, the ring flux guide 90 is made of laminations to reduce eddy current losses. In the embodiment of FIGS. 1A–1C, the ring flux guide 90 is also mounted to support sleeve 15 which is attached to motor base 14. A complete stator subassembly comprising support sleeve 15, ring 90, posts, coils and stator teeth can thus be fabricated before it is attached to motor base 14.

FIG. 1C is an isometric partial cutaway view of the motor illustrated in FIGS. 1A–1B, but without the motor base 14, support sleeve 15 and ring magnet 34. FIG. 1C shows the structural relationship of the flux ring 90 with the posts, coils and stator teeth.

The operation of the spindle motor 10 as thus described can be better understood by considering the path of the magnetic circuit within the rotor and stator portions. In FIGS. 1A–1C, the magnetic circuit is indicated by arrows in solid and dashed lines, with directional components out of the figure being depicted by a circled x; and components into the figure being depicted by a circled dot. Referring to FIGS. 1A and 1B, beginning at the permanent ring magnet segment 37 at the radially outer surface 67 that faces gap 70, the magnetic circuit passes in a radial direction across gap 70 to outer stator tooth face 66 and through stator tooth 63 to post 73. The flux path then turns axially downward through post 73 (FIGS. 1B and 1C). The flux path is then split into two opposite portions toward posts 71 and 75 as it is turned circumferentially through ring flux guide 90. The portion of the flux in ring 90 that is directed to post 71 is shown by the arrow in FIG. 1C. Referring to that portion, the flux path is circumferential until it reaches post 71. It then turns axially upward through post 71 (and the center of coil 81), then radially outwardly through stator tooth 61 to the gap 70 between stator tooth 61 and the outer face of the ring magnet. The flux path is then radially through the magnet segment 39 (FIG. 1A), and back into the backing rim 32. The backing rim 32 provides a circumferential return path for the flux back to the portion of rim 32 behind magnet segment 37. From there the flux path is radially back through magnet segment 37 to the face 67, from where it began (FIG. 1A). If there is current flowing through any of the coils, it serves to either increase or decrease the net magnetic flux flowing axially through the posts. If the hub 30 is formed of magnetically permeable material then there is no need for a separate backing rim 32. In that case the outer hub rim 33 provides the same flux path as backing rim 32.

With this magnetic circuit the spindle motor 10 allows for a large volume of coils that are not limited to the space between stator teeth, as is the case with conventional stator coils that generate radial fields directed across the radial gap. The stator teeth can also be placed arbitrarily close together. The coils that generate the axial fields are located underneath the bearing assembly and hub 30. This allows for a large coil volume. In the preferred embodiment the support sleeve 15 (FIG. 1B) is also used to fully enclose the coils and act as a protective seal to prevent contaminants from the coils from leaving the motor. This is especially important in magnetic recording disk drives where the head-disk interface is sensitive to contaminants. Support sleeve 15 should be made of a material that is not magnetically permeable, such as plastic or anodized aluminum. If the material of sleeve 15 is conductive, then there should be an electrical insulation barrier between it and the stator teeth and posts. Oxide coatings and inorganic or organic insulation can be used for this purpose. In addition an epoxy material can be placed between the coils and sleeve 15 to enhance heat transfer from the coils and thus minimize resistive losses from the coil temperature rise.

In the motor shown in FIGS. 1A–1C, the placement of the coils near the base 14 also provides an excellent heat conduction path. The ring flux guide 90 also dissipates heat from the motor by conducting it to the base 14, thereby reducing the amount of heat that reaches the motor bearings.

Figure 2:
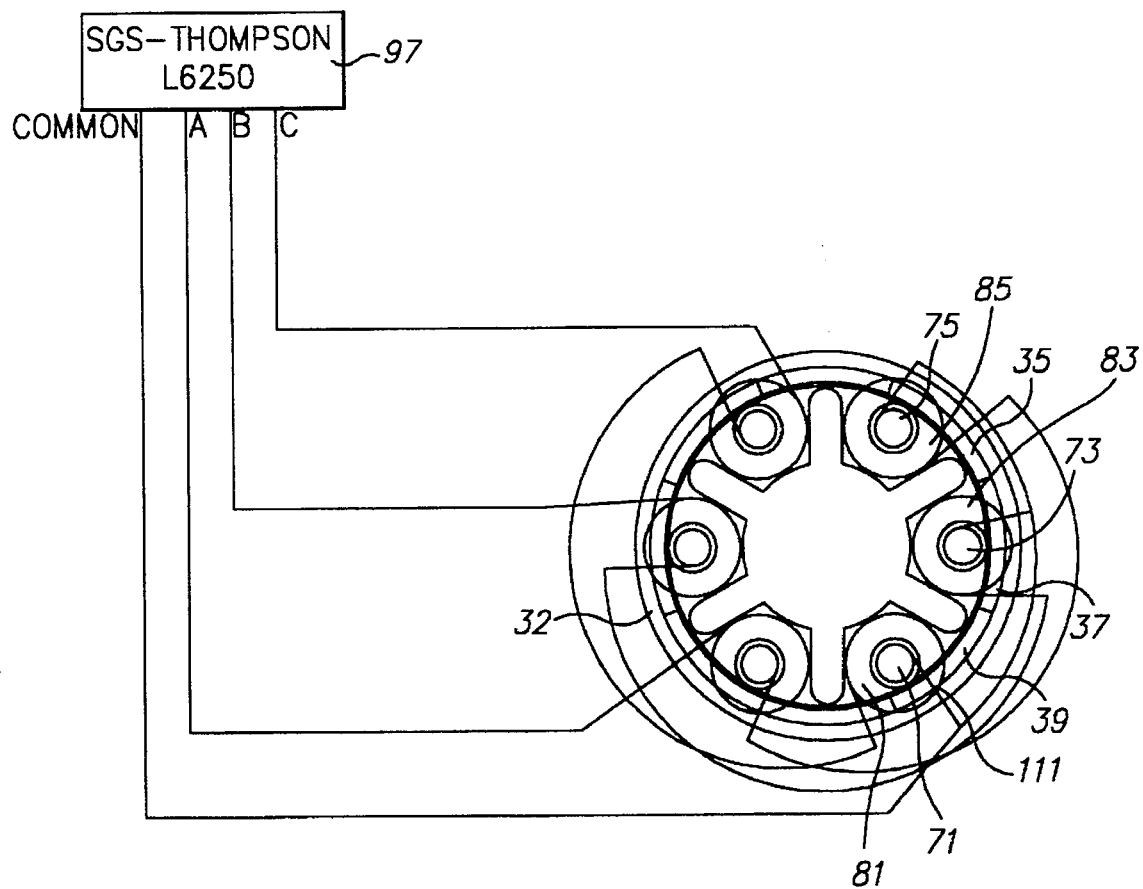
FIG. 2 is a block diagram of the electrical connection of the coils to the motor control circuitry.

FIG. 2 is a diagram showing the wiring connection to the individual coils on each of the stator teeth and attachment to conventional electrical commutation circuitry, such as SGS-Thompson L6250 disk drive spindle motor and voice coil motor (VCM) power and control chip module 97. As is well known the coils are connected in groups called phases. The connection scheme shown in FIG. 2 is the conventional Y pattern with the coils connected in series. The coils could also be connected in the conventional Delta pattern. The coils in a phase can be connected either in series or parallel.

Figure 3:
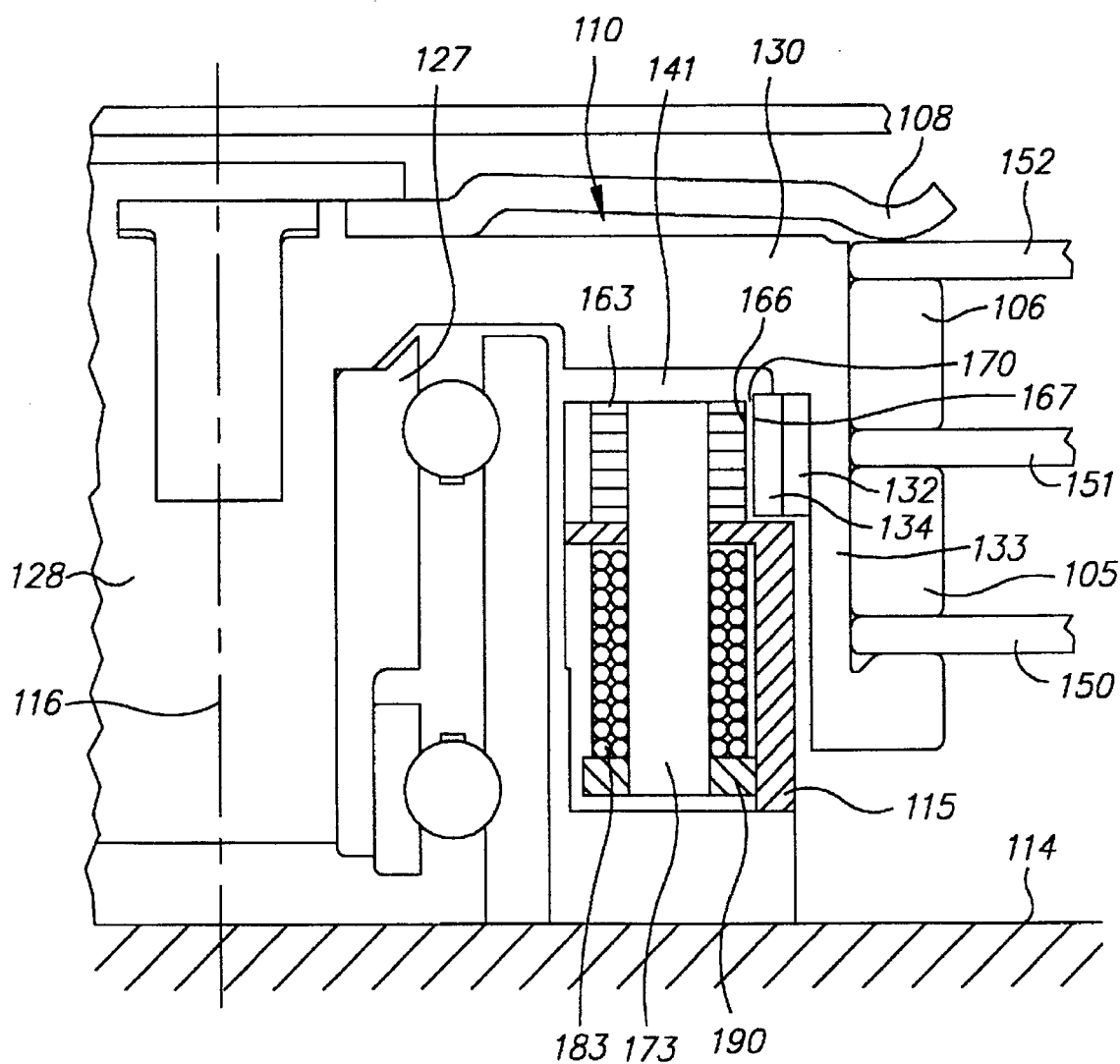
FIG. 3 is a sectional view of a portion of an alternative embodiment of the motor showing the motor in an in-hub design with a rotating shaft.

FIG. 3 shows an alternative embodiment of the present invention. The motor 110 is located in substantially the same horizontal plane as the bearing cartridge 127 but at a larger radius. In this embodiment support sleeve 115 is used to support the posts, such as post 173, and the stator teeth, such as stator tooth 163, in both the axial and radial direction, as well as the ring flux guide 190. Sleeve 115 also seals coil 183 to prevent contamination of the interior of the disk drive. In this embodiment the outer race of bearing cartridge 127 is mounted to the disk drive base 114 and the shaft 128 is rotatable about rotational axis 116. The shaft 128 and the hub 130 are a single-piece integral member. Three magnetic recording disks 150, 151, 152 with spacers 105, 106 are mounted on hub 130 and held in place by disk clamp 108. In the embodiment of FIG. 3 essentially the entire assembly of ring flux guide 190 and connected posts, coils and stator teeth extend axially into hub cavity 141. The backing rim 132 is not required if the shaft 128 and hub 130 are formed of magnetically permeable material.

Figure 4A:
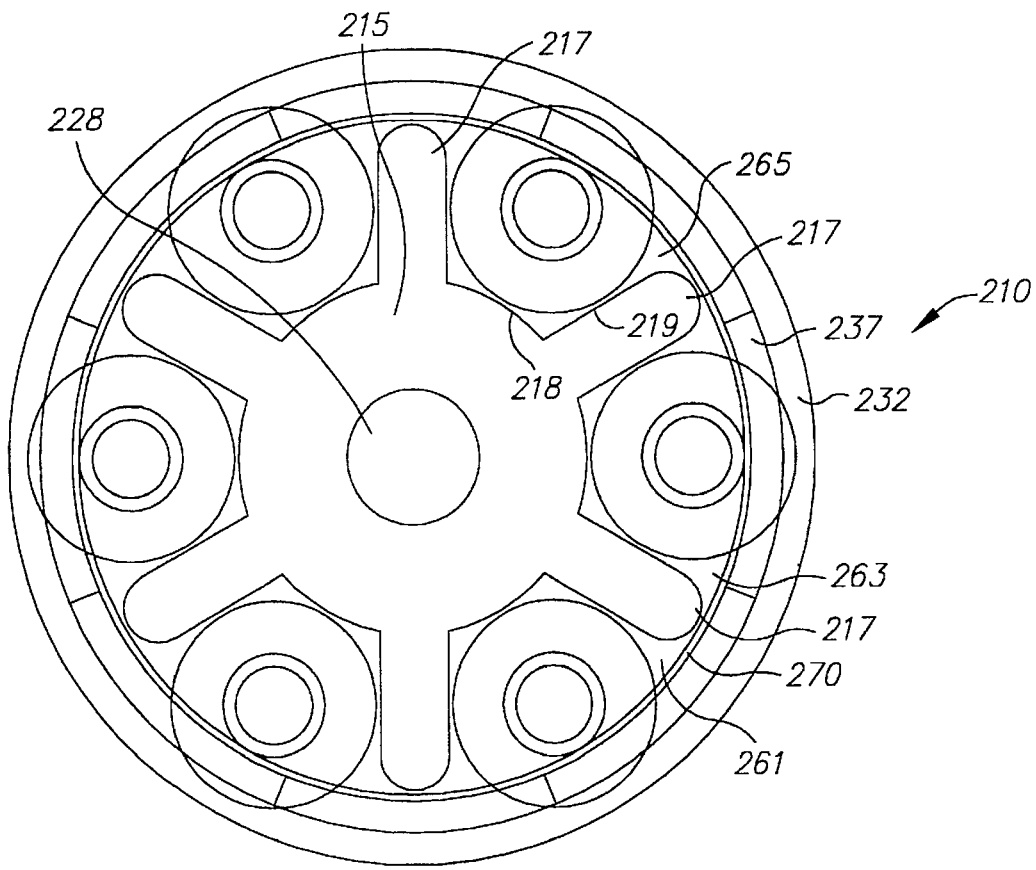
FIG. 4A is a top view of a second alternative embodiment of the motor showing a different stator teeth support structure.
Figure 4B:
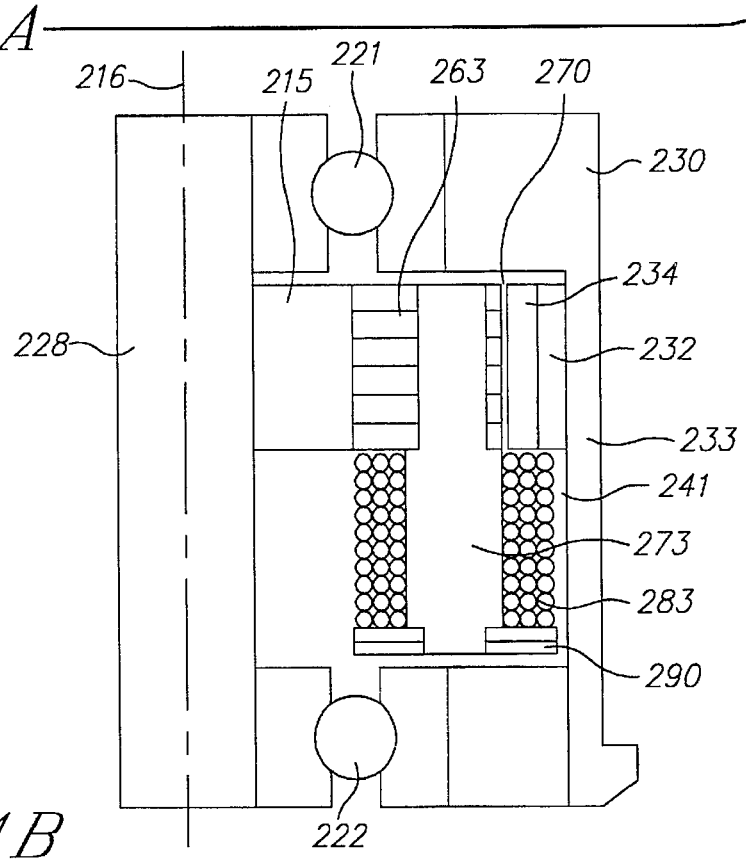
FIG. 4B is a sectional view of a portion of the alternative embodiment of FIG. 4A and showing the stator teeth support structure and the stator located axially between the upper and lower bearings.

FIGS. 4A and 4B shows a second alternative embodiment of the present invention. In this embodiment the motor 210 is located between an upper bearing 221 and a lower bearing 222. The stator teeth, such as typical teeth 261, 263 and 265 are now supported by a support disk 215 with radially directed fingers 217 that separate adjacent stator teeth near their radially inner faces. The support disk 215 has the same axial thickness as the stator teeth lamination stacks. Adhesives are used along the cylindrical surfaces 218 solely or in combination with adhesives along surfaces 219 of the radial fingers 217 to bond the stator teeth to the support disk 215. The use of the support disk 215 with radial fingers 217 allows the stator teeth to be formed as a single-piece structure with a very small material connection at the radially outer faces of the teeth near the gap 270. As shown in FIG. 4A, the stator teeth are continuous without any physical angular separation near the radial gap 270. The support disk 215 also supports the posts, coils and ring flux guide 190 within the hub cavity 241, as shown in FIG. 4B. The support disk 215 is preferably made of anodized aluminum.

While the preferred embodiments of the present invention have been illustrated in detail, it should be apparent that modifications and improvements may be made to the invention without departing from the spirit and scope of the invention as described in the following claims.

What is claimed is:

1. A brushless direct current motor comprising:

a base;

a shaft having a central axis extending from and fixedly attached to the base;

a lower ring bearing having radially inner and outer races with its inner race fixedly attached to the shaft;

an upper ring bearing having radially inner and outer races with its inner race fixedly attached to the shaft, the upper and lower bearings being spaced apart a fixed distance along said central axis;

a hub mounted to the outer races of the lower and upper bearings and rotatable about a central rotational axis generally coincident with said central axis of the shaft, the hub having a radially outer hub rim, the outer hub rim, the shaft and the spaced-apart lower and upper bearings defining a generally annularly shaped cavity located between the shaft, the outer hub rim and the spaced-apart bearings;

a magnetically segmented ring magnet attached to and located radially inwardly of the outer hub rim within said cavity for generating magnetic fields in a generally radial direction;

a plurality of stator teeth circumferentially spaced around the rotational axis, each stator tooth having a radially outer face spaced from and located radially inwardly of the ring magnet so as to define a radial gap;

a like plurality of magnetically permeable posts, each post extending in an axial direction generally parallel to the rotational axis and being connected to a corresponding stator tooth;

a like plurality of conductive coils, each coil being wound around a corresponding post for generating a magnetic field in an axial direction through its corresponding post and its corresponding stator tooth when conducting electrical current;

a ring flux guide of magnetically permeable material interconnecting adjacent posts in a generally circumferential direction; and a support disk attached to the shaft, the support disk being attached to and supporting said interconnected stator teeth, posts, coils and ring flux guide within said cavity; whereby magnetic flux from the ring magnet is directed radially inwardly across the radial gap to the face of a first stator tooth, axially through the post and coil on said first stator tooth, circumferentially by the ring flux guide to the post and coil on a second stator tooth adjacent said first stator tooth, axially through the post and coil on said second stator tooth, radially outwardly from the face of said second stator tooth across the radial gap to the ring magnet.

2. The motor according to claim 1 wherein the central planes of the ring magnet and each of the stator teeth are substantially coplanar.

3. The motor according to claim 1 further comprising a protective sleeve surrounding the coils for containing contaminants in the region of the coils.

4. The motor according to claim 1 wherein the support disk has radially directed fingers located between each of the stator teeth, the stator teeth being attached to and thereby supported by the fingers.

5. The motor according to claim 1 wherein the stator teeth are formed as a single piece structure with the teeth being connected to one another near their radially outer faces.

6. The motor according to claim 1 further comprising a magnetically permeable backing rim attached to an inner circumferential wall of the outer hub rim within said cavity, and wherein the magnetically segmented ring magnet is attached to and located radially inwardly of the backing rim; whereby the backing rim provides a magnetic flux path between adjacent magnet segments.

7. A data disk drive motor assembly comprising:

the motor according to claim 1; and a data disk mounted to the hub.

* * * * *